(No Model.) 8 Sheets—Sheet 1.

F. H. RICHARDS.
GRAIN WEIGHER.

No. 442,712. Patented Dec. 16, 1890.

Witnesses:
W. M. Kyorkman
Henry L. Rickard.

Inventor:
Francis H. Richards (No Model.) 8 Sheets—Sheet 2.

F. H. RICHARDS.
GRAIN WEIGHER.

No. 442,712. Patented Dec. 16, 1890.

Witnesses:
W. M. Bjorkman,
Henry L. Reckard.

Inventor:
Francis H. Richards (No Model.) 8 Sheets—Sheet 3.
F. H. RICHARDS.
GRAIN WEIGHER.

No. 442,712. Patented Dec. 16, 1890.

Witnesses:
W. M. Bjorkman.
Henry L. Reckard.

Inventor:
Francis H. Richards (No Model.)  8 Sheets—Sheet 4.

F. H. RICHARDS.
GRAIN WEIGHER.

No. 442,712.  Patented Dec. 16, 1890.

Witnesses:
W. M. Bjorkman
Henry L. Reckard

Inventor:
Francis H. Richards (No Model.) 8 Sheets—Sheet 5.
F. H. RICHARDS.
GRAIN WEIGHER.

No. 442,712. Patented Dec. 16, 1890.

Witnesses:
W. M. Bjorkman,
Henry L. Reckard.

Inventor:
Francis H. Richards (No Model.) 8 Sheets—Sheet 6.
F. H. RICHARDS.
GRAIN WEIGHER.

No. 442,712. Patented Dec. 16, 1890.

Witnesses:
W. M. Bjorkman.
Henry L. Reckard.

Inventor:
Francis H. Richards (No Model.) 8 Sheets—Sheet 7.

F. H. RICHARDS.
GRAIN WEIGHER.

No. 442,712. Patented Dec. 16, 1890.

Witnesses:
W. M. Bjorkman
Henry L. Reckard

Inventor:
Francis H. Richards (No Model.)  
8 Sheets—Sheet 8.

F. H. RICHARDS.
GRAIN WEIGHER.

No. 442,712. Patented Dec. 16, 1890.

Witnesses:
W. M. Bjorkman.
Henry L. Reckard.

Inventor:
Francis H. Richards

United States Patent Office.

FRANCIS H. RICHARDS, OF HARTFORD, CONNECTICUT, ASSIGNOR TO THE PRATT & WHITNEY COMPANY, OF SAME PLACE.

GRAIN-WEIGHER.

SPECIFICATION forming part of Letters Patent No. 442,712, dated December 16, 1890.

Application filed February 17, 1890. Serial No. 340,814. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Grain-Weighers, of which the following is a specification.

This invention is generic in character and scope, and comprises under one general form a series of specific inventions, which are also described and specifically claimed in separate applications.

The object of my present improvements is to furnish means for actuating the same valve or valves of an automatic grain-weigher by power from different sources, of which sources one is the scale-beam and the other a regulator constructed to yield or to be operated on the accumulation of the discharged grain, so that the same valve (or valves) is normally actuated by or from the scale-beam and is exceptionally actuated by or from the regulator, thereby serving first as a cut-off valve and secondly as a regulator-valve.

In the drawings, accompanying and forming a part of this specification.

Similar characters designate like parts in Figs. 1 to 5, inclusive. In Figs. 6 to 15, inclusive, the different characters conform to the several applications, respectively, from which said figures are taken.

The frame-work for carrying the operative parts of this machine usually, and as shown in the drawings, comprises two side frames or uprights 2 and 4, held together by the top plate 5, carrying the supply-chute H, and by usual tie-rods (not shown;) but any suitable form of frame-work adapted to carry the operative parts of the machine may be used. The grain-bucket G, of the double-chambered oscillating type or class, (here shown in dotted lines, its pivot being designated by the numeral 12 and its discharge-chutes by 34 and 36,) is suspended under the chute H, and discharges its loads of grain intermittently, as shown and described in prior Letters Patent of the United States. The usual and necessary means for supporting and operating said bucket are not shown in this application, but are set forth in prior Letters Patent. One set of devices suitable therefor is shown in Letters Patent No. 403,988, granted to C. H. Cooley May 28, 1889. The scale-beam B has V-shaped bearings 20, one at each end thereof, which rest on the pivots or knife-edges 24 and 26, that are suitably supported, as by bearings 23 and 25 on the frame-work. Said beam B has the principal arms 19 and 21, furnished with the knife-edges 15 and 17, for the support of the usual hangers (not shown) that carry the grain-bucket G. Opposite to arms 19 and 21 an arm 28 extends rearwardly, and is provided with a knife-edge 27, on which the main weight W (also designated as the counter-weight) is suspended by a hook 29.

The reducing-valve 60 is carried by the arms 62 and 64, which are fixed to the pivot or valve-shaft 61, in the usual way, said valve being furnished with a suitable stop, as 66. The valve 60 (or the shaft thereof) is furnished with the valve-lever 69, which is operated by the arm 71, after the manner described and claimed in the application of C. H. Cooley, Serial No. 338,818, filed February 31, 1890, to which I have permission to refer. The lever 69 is usually weighted, either by a weight formed thereon or by the weight 59, attached thereto.

The cut-off valve 70 and its accessory devices are of the kind described and claimed in the joint application of C. H. Cooley and F. H. Richards, Serial No. 339,967, filed February 11, 1890. Said valve 70 is carried by the arms 72 and 74, which are pivoted at 73 to the sides of the supply-chute H. Arm 72 extends above said pivot and has formed thereon or secured thereto the cut-off valve-cam 68. Continuing upward said arm is provided with a suitable weight, as 90. The preferred construction, the utility, and the mode of operation of said valve, together with the cam 68 and the weight 90 are matters fully set forth in said application.

Figure 1:
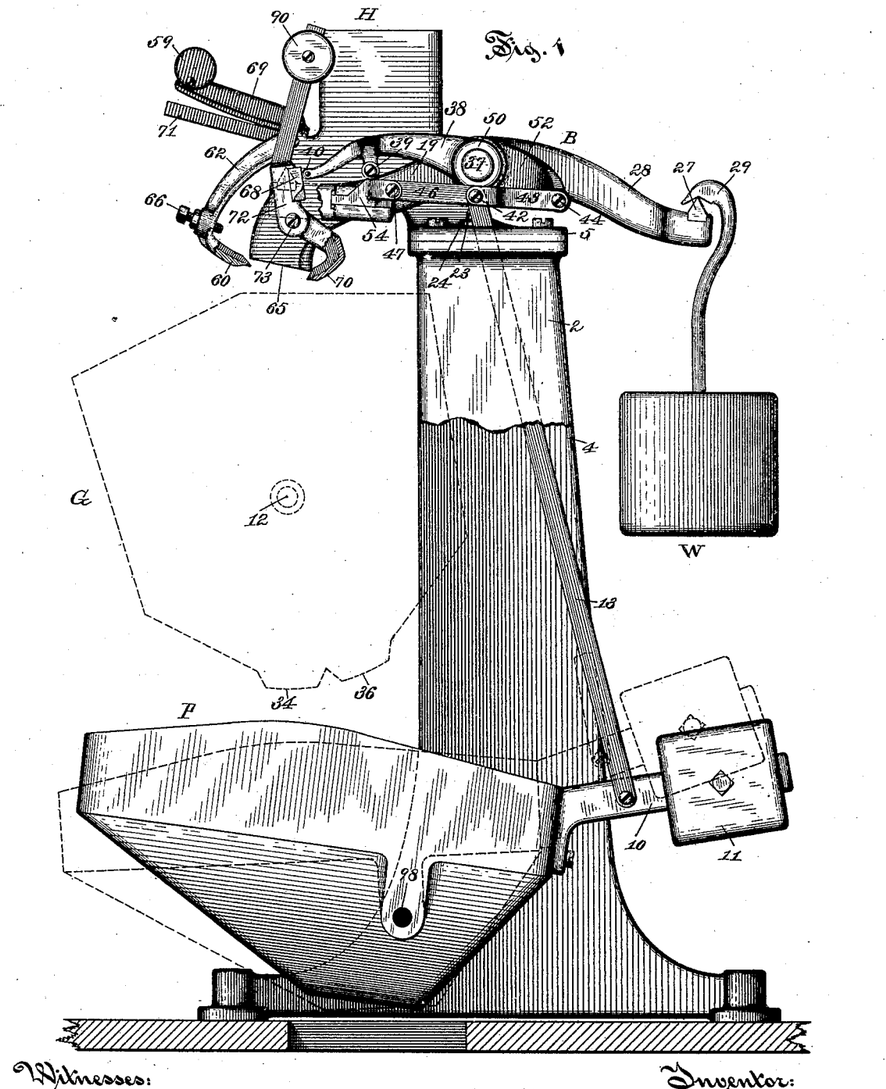
Figure 1 is a side elevation of an automatic grain-weigher embodying my present improvements, some parts being broken away and other parts shown in dotted lines.
Figure 2:
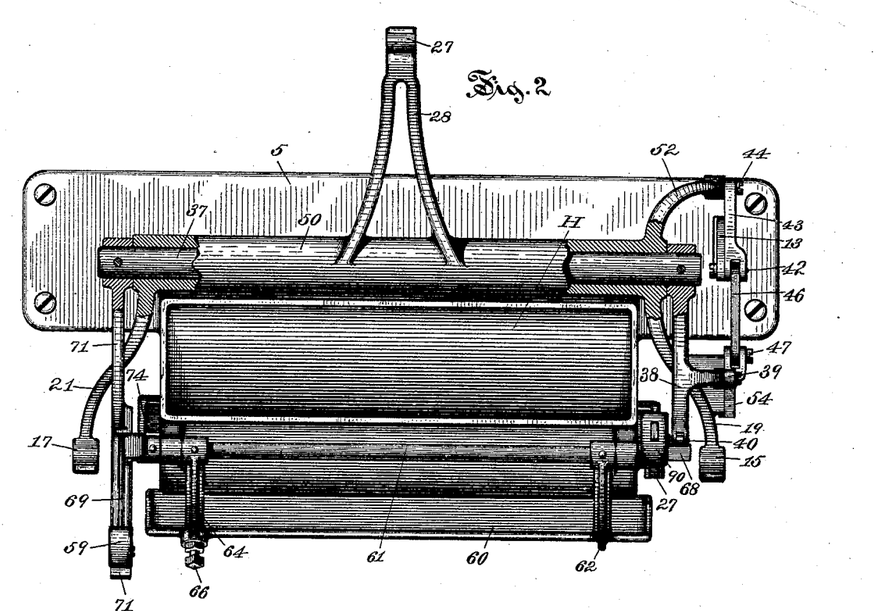
Fig. 2 is a plan view of the upper part of Fig. 1.
Figure 3:
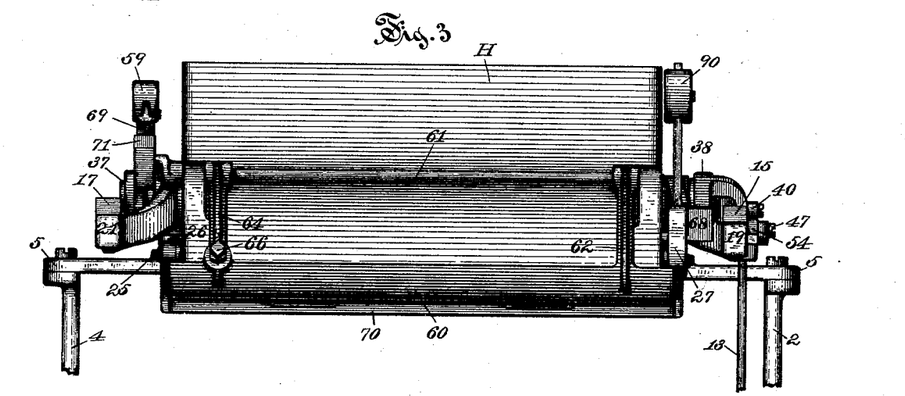
Fig. 3 is a front elevation of the parts shown in Fig. 2.
Figure 4:
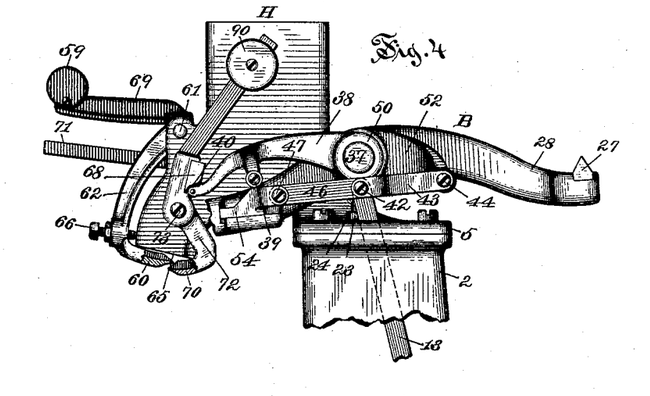
Figs. 4 and 5 are side elevations similar to the upper portion of Fig. 1, showing the parts in different positions and illustrating their mode of operation. In the preceding figures the shiftable valve-actuator is shown carried on the scale-beam and constructed to actuate two valves. In the following figures other forms and modes of construction of said valve-actuator are shown.
Figure 5:
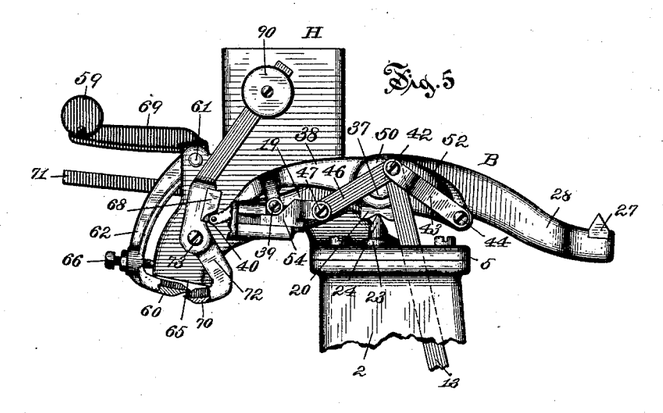

The regulator P and certain combinations therewith shown herein embody improvements constituting the subject-matter of a separate application filed by C. H. Cooley and F. H. Richards, Serial No. 338,817, filed January 31, 1890, to which reference may be had. The said regulator P is supported between the uprights 2 and 4 of the frame-work by suitable pivots at 98, and has attached thereto in any well-known manner the arm 10, carrying the counter-weight 11. To the said hopper is pivotally connected the rod 13, which is pivoted at 42 to the actuator-shifting devices. As shown in the drawings, Figs. 1 to 5, these devices consist of the links 43 and 46. Link 43 is pivoted at its opposite end at 44 to the arm 52 of the beam B, and link 46 is pivoted at its forward end at 47 to the sliding cam 54, which is fitted to slide in guides formed therefor on the arm 19 of the scale-beam. The arm 38 on the shaft 37 is furnished with a cam-roll 39, which bears on the sliding cam 54, and at its forward end carries the valve-actuator, which, as herein shown, consists of a cam-roll 40, journaled in the forward end of said arm and acting on the cut-off-valve cam 68. The arm 38 is fixed to one end of the valve-actuating shaft 37, which is fitted to turn freely within the hollow shaft 50 of the beam B, and which has secured to the opposite end thereof the aforesaid arm 71 for actuating through the lever 69 the reducing-valve 60. From this description it will be evident how the described actuator-shifting devices serve to shift the actuator 40 of the valve 70, and also to shift the actuating-arm 71 of the valve 60 from their operative to their inoperative positions. (Shown in Figs. 1 and 5, respectively.) In Fig. 1 the beam stands up and the valve-actuators stand in their uppermost or operative position relatively to the beam. In Fig. 4 the same positions are maintained, except that the beam is down, thus allowing both valves to close. In Fig. 5 the beam is up, but both actuators are lowered relatively thereto, so that both valves are closed, said actuators being lowered by the links 43 and 46, drawing back the cam 54, as there shown, and those links being operated by the rod 13 from the descent or yielding movement of said hopper P, or of some other suitable regulator whose operation is controlled by the accumulation of discharged grain. When the accumulation of grain has been sufficiently discharged to permit the regulator to make its return-stroke, the rod 13, being operated by said regulator, acts through the toggle-links and the cam 54 to lift the actuators 40 and 71 relatively to the beam, thus opening the valves, as in Fig. 1, and starting the machine.

In the above description the roll 40 is considered to be the "actuator" for said valve 70, because said roll bears against the valve-arm; but the arm 38 is properly, in a general sense, the actuator for said valve, since the roll 40 is in itself a minor device, and since a rounded end for said arm in place of said roll would fairly perform the same function. By the term "valve-actuator," therefore, I mean the part which directly actuates the cam, whether it consists of several pieces or be integral.

In the machine thus described, as will now be evident, the valve or valves are "normally" actuated by the scale-beam through a valve-actuator carried in a normally-fixed position on said beam, also the actuator being shiftable on said beam by the action of the regulator apparatus, and being intermediate to the regulator and the valves, the valve or valves are "exceptionally" actuated by said regulator apparatus independently of the beam movement, so that the same valve serves first as a cut-off valve and secondly as a regulator-valve, and so that the valve closes on the "working stroke" of the regulator.

Figure 6:
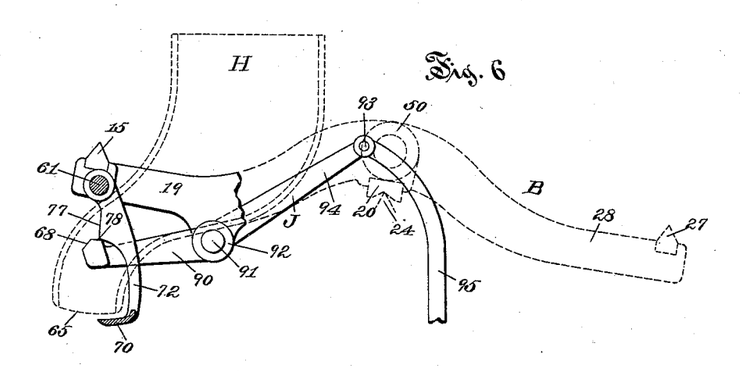
Figs. 6 and 7 show the construction and arrangement and illustrate the mode of operation of one form of the shiftable valve-actuator broadly claimed herein, and more particularly described and claimed in my application, Serial No. 341,104, filed February 20, 1890.
Figure 7:
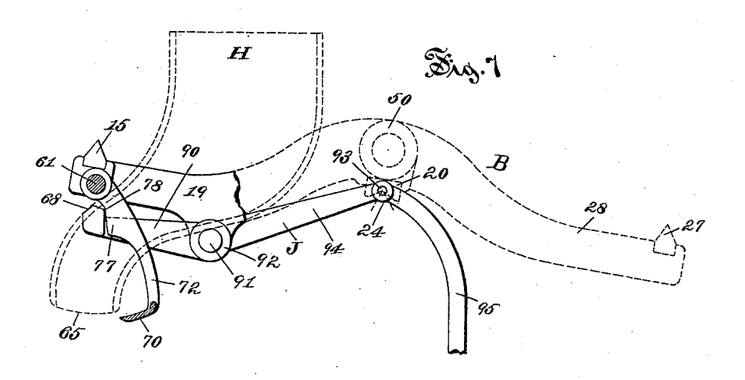

In Figs. 6 and 7 my improvements are shown arranged for the form of cut-off valve described and claimed in the application of C. H. Cooley, Serial No. 338,818, filed January 31, 1890. In this modification of my present invention the cut-off valve 70 is suspended by arms 72 from the pivot 61 or from some point near thereto. The arm 72 has a cam-shaped part 77, which is acted on by the cam 78, that is carried by the beam B. When this beam is down, the valve 70 is closed, and (the reducing-valve being also closed) cuts off the flow of grain. But when the beam rises, as in Fig. 6, the cam 78 strikes cam 77 and forces back arm 72, thus opening the valve 70, as in Fig. 7. The cam 78 is carried by the actuator-arm 90, forming one end of the lever J, which is pivoted to the beam at 91, and whose opposite end 94 is connected at 93 by the rod 95 with the regulator. The mode of operation is substantially the same as that of the actuator-arm shown in the preceding figures.

In Figs. 6 and 7 the reference-characters conform strictly to the application Serial No. 341,104, filed February 20, 1890, from which these figures are taken; but as to the principal parts said characters also correspond with Figs. 1 to 5, inclusive. This arrangement, which seems necessary on account of the numerous applications herein referred to also applies to the remaining figures in this application.

Figure 8:
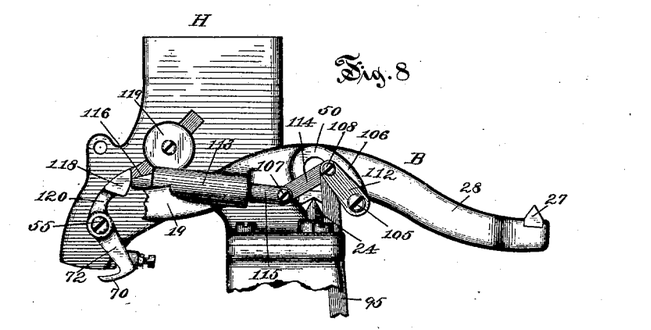
Figs. 8 and 9 show the construction and arrangement and illustrate the mode of operation of another form of the shiftable valve-actuator broadly claimed herein, and more particularly described and claimed in my application, Serial No. 324,242, filed September 17, 1889.
Figure 9:
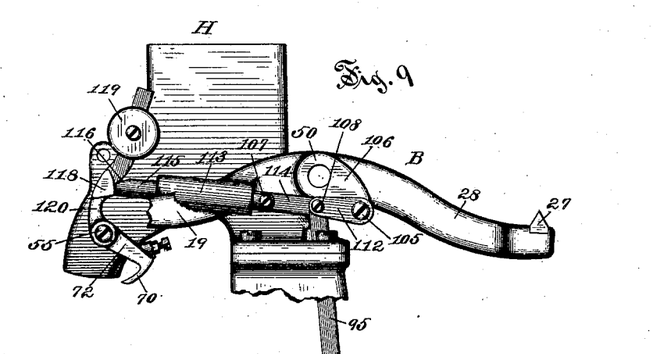

In Figs. 8 and 9 my improvements are shown adapted for operating the form of cut-off valve described in the application of C. H. Cooley and F. H. Richards, Serial No. 339,967, filed February 11, 1890, to which reference may be had. In this modification the actuator 115 is carried by the arm 19 and arranged to have a reciprocating movement, and is actuated through links 114 and 112, which connect said slide 115 with the fixed pin 105, carried by the arm 106 of the beam, said links being connected by the rod 95 to be operated from the regulator-hopper P. The rod 95 being connected to the regulator is actuated thereby on the rising or falling of said regulator, thus operating the links to shift the actuator from its inoperative position in Fig. 8 to its operative position in Fig. 9, or vice versa, as the case may be. The shiftable actuator is in these figures shown fitted to be moved in the sleeve 113 of the arm 19 in a direction substantially radial to the axis 24 of the main beam, so that the movement of said actuator independently of the beam does not materially tend to move the beam up or down. This feature is further described and claimed in said application, Serial No. 324,242, filed September 17, 1889. In Fig. 9 the links 112 and 114 stand in about a straight line, the middle pivot 108 of the linkage being substantially coincident with the axis 24 of the beam. By virtue of this arrangement the working of said links by the regulator does not materially tend to move the beam, but is divided between the pin 105 and the slide 115, leaving the beam substantially neutral and unaffected. When the parts are relatively positioned, as in Fig. 9, and on the rising of the beam the valve-actuator bears against the valve-cam 118, thus opening the valve 70, and when the parts are relatively positioned, as in Fig. 8, the straightening of the toggle by shifting the actuator from its position in Fig. 8 to that in Fig. 9 accomplishes the same result. The remarks respecting reference-characters made in connection with Figs. 6 and 7 also apply to Figs. 8 and 9, which are copied from and fully described in said application, Serial No. 324,242, filed September 17, 1889, to which reference may be had.

Figure 10:
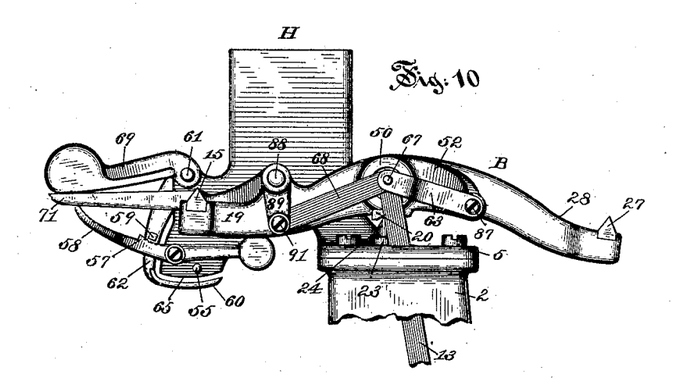
Figs. 10 and 11 show the construction and arrangement and illustrate the mode of operation of a fourth form of the shiftable valve-actuator broadly claimed herein, and more particularly described and claimed in my application, Serial No. 341,196, filed February 20, 1890.
Figure 11:
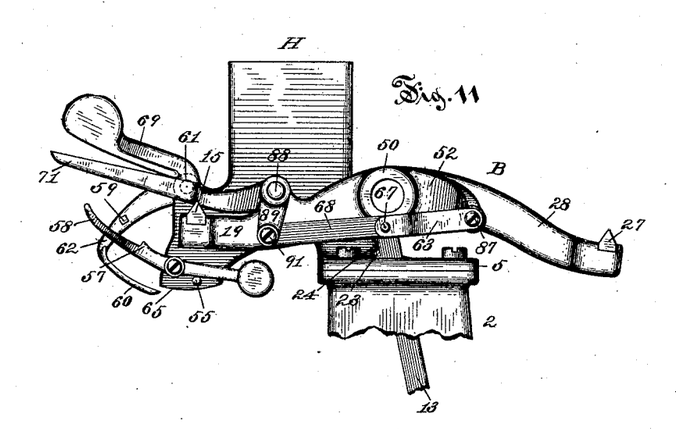

In Figs. 10 and 11 my improvements are shown arranged for operating a single valve, which is substantially of the same kind as the reducing-valve described and claimed in the application of C. H. Cooley, Serial No. 338,818, filed January 31, 1890. This modification of my present invention is more particularly described and claimed in my application, Serial No. 341,196, filed February 20, 1890, from which separate application Figs. 10 and 11 are taken. In this form of the mechanism the valve 60 has a valve-lever 69, operated by the shiftable valve-actuator 71, which is pivoted to the beam at 88, and whose other arm 89 is connected at 91 to one end of the toggle-links 68 and 63, said toggle being connected at its opposite end to the arm 52 of the beam, and at the middle joint 67 thereof to the connecting-rod 13 that leads to the regulator. During the regular working of the machine the said actuator and its shifting devices stand relatively to the beam, as in Fig. 11; but on the regulator yielding or making its working-stroke said parts are shifted to their inoperative position in Fig. 10, thereby permitting the lever 69 to be lowered and close the valve. This shifting movement is independent of the beam movement, the beam being in its uppermost position in both said figures. The toggle-links and their arrangement relative to the beam axis are or may be the same as those features described in connection with Figs. 8 and 9. The same rule respecting reference-characters as was observed in connection with Figs. 6 and 7 and in connection with Figs. 8 and 9 is also followed in this description of Figs. 10 and 11.

Figure 12:
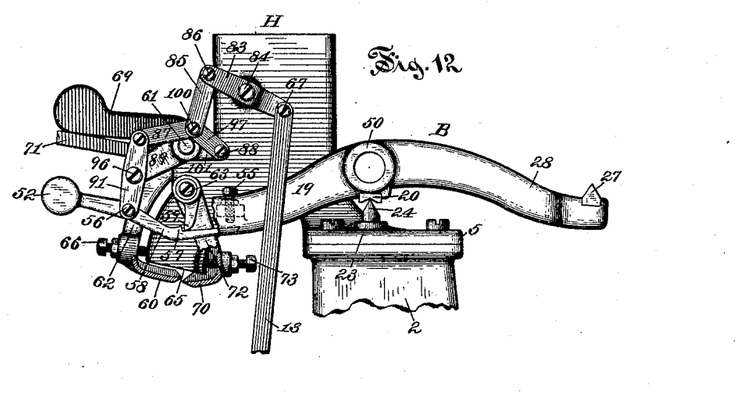
Figs. 12 and 13 show the construction and arrangement and illustrate the mode of operation of a fifth form of the shiftable valve-actuator broadly claimed herein, and more particularly described and claimed in my application, Serial No. 341,499, filed February 24, 1890.
Figure 13:
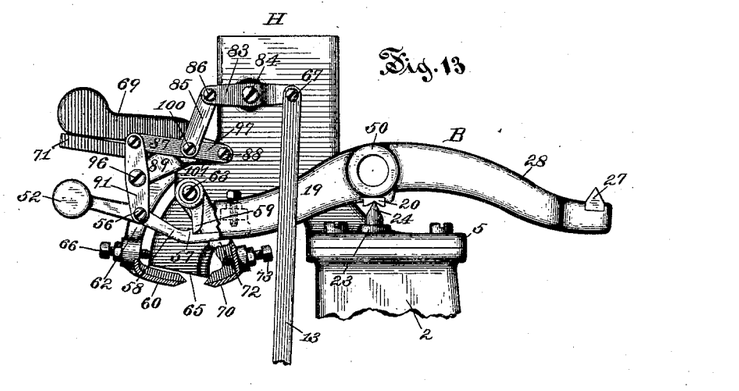

In Figs. 12 and 13 my improvements are shown in a form so modified that the shiftable valve-actuator for the cut-off valve is carried on the reducing-valve and not on the beam; but even in this arrangement the actuator is still normally actuated by the beam, since said actuator is carried by the reducing-valve and since this valve is operated directly by the beam. This modification of my present invention is more fully set forth and is further claimed in a separate application, Serial No. 341,499, filed February 24, 1890. The construction and operation of this modification are substantially as follows: The reducing-valve 60 is carried by arms, as 62, from a shaft 61, journaled in suitable bearings, the stop 66 limiting the closing movement of the valve. Said reducing-valve, together with its lever 69 and the beam-arm 71 for actuating said lever, are of the kind described and claimed in the application of C. H. Cooley, Serial No. 338,818, filed January 31, 1890, to which I have permission to refer. The cut-off valve 70 is similarly supported on pivots at 63 to the frame-work, and usually has a suitable stop, as 73, to limit its closing movement. Said valve 70 is both a cut-off valve and a regulator-valve. For the first purpose it is operated directly from the reducing-valve, and for the second purpose from the regulator through the shiftable valve-actuator 58. This actuator is carried on a pivot 56, which normally has a fixed relation to the valve 60, as shown in Figs. 12 and 13, so that as said valve 60 is moved the said actuator is carried with it. Assuming this construction and arrangement to be thus, the regulator operation is as follows: The actuator 58 has a catch 57 formed thereon to engage the arm 59 of the cut-off valve 70. A small counter-weight 52 serves to normally hold the actuator 58 in engagement with the arm 59. When the valve 60 is opened, the catch 57 comes forward of arm 59, and on the closing of said valve engages said arm 59 to open the cut-off valve, as shown in Fig. 13. The main column of grain having been thus cut off by the valve 60, the opening of valve 70 allows the "drip" to flow until the bucket-load is completed. This being done the beam descends, as in Fig. 12, until the stop 55 on said beam strikes the end of said actuator 58 and detaches the catch 57, thereby permitting the valve 70 to close, as in said Fig. 12. On the rising again of the scale-beam, as in Fig. 1, the valve 60 is again opened and the said several parts are in position for repeating said operation. This constitutes the ordinary and regular action of the machine. For effecting the regulation of the machine the said valve-actuator is made shiftable relative to the principal valve. This shifting movement may be accomplished by means of various mechanical devices, but is properly accomplished as follows: The actuator 58 is pivotally supported at 56 on the actuator-carrier 91, which is pivoted at 96 to the arm 89 that is fixed on the shaft 61. The carrier 91 is shifted or turned on its said pivot 96 by means of a suitable shifting device, which in this instance consists of links or toggles 87 and 97, that connect the upper end of said carrier with the pivot 88 on the opposite arm 101, also fixed on shaft 61. When the said links are in a line, as in Fig. 13, the pivot 100 should stand about in alignment with the axis of shaft 61, so that the movement of the axis of said shaft and the parts carried thereby will not materially operate said links or the carrier 91. For actuating the toggle-links I connect their center pivot 100 by a link 85 to the end 86 of the lever 83, which is pivoted at 84 to the chute H, and at its opposite end 67 to the rod 13, that is actuated by the regulator. By means of this or any similar connecting device the descent of the regulator by the action of the grain thereon shifts the carrier 91 to throw the shiftable actuator from its operative position in Fig. 13 to its inoperative position shown in Fig. 12. This allows the valve 70 to close, whether the valve 60 be closed or open, and thus results in stopping the operation of the machine.

The same rule respecting reference-characters as was observed in connection with the preceding Figs. 6 to 11, inclusive, has also been followed in this description of Figs. 12 and 13.

Figure 14:
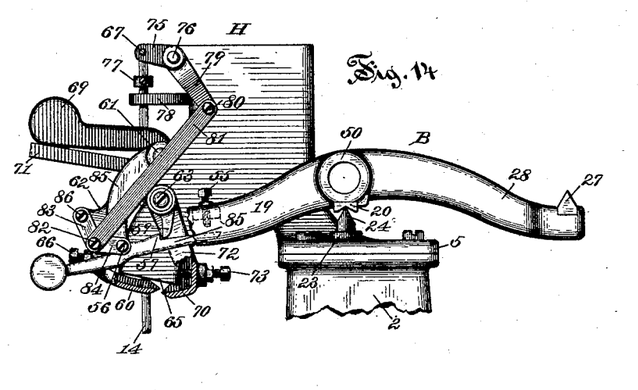
Figs. 14 and 15 show the construction and arrangement and illustrate the mode of operation of a sixth form of the shiftable valve-actuator broadly claimed herein, and more particularly described and claimed in my application, Serial No. 341,197, filed February 20, 1890.
Figure 15:
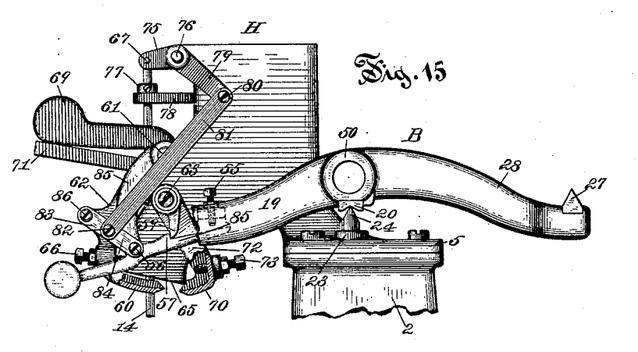

In Figs. 14 and 15 my improvements are shown of a general form similar to that shown in the two preceding figures, and of the particular form and arrangement set forth in my application, Serial No. 341,197, filed February 20, 1890, to which reference may be had. The principal feature of this modification is the use of a different form of regulator, in which the working-stroke is reversed relatively to that of the hopper P, and in which the descent of regulator N (see said application) causes the opening of the regulator-valve instead of closing the same, as in the other described forms of my present improvements. In this modification the said movements, as compared with those of the preceding forms, are of the nature of "negative" as compared with "positive." The nature of the operations are substantially the same, (so far as concerns my present invention,) notwithstanding the direction of their movements in space, and the order of said movements may be reversed. The reducing-valve 60, together with its shaft 61, lever 69, stop 66, the beam B, with its arm 71 and stop 55, the actuator 58, with its catch and counter-weight, the cut-off valve 70, with its stop and its arm 59—these several details are or may be all the same as said parts shown in Figs. 12 and 13. In the present case, however, the shifting devices are modified. The actuator 58 is carried by the pivot 56, which is on an arm 85, that is supported on shaft 61. The toggle-links 83 84 connect the pivot 56 with the pivot 86, fixed to the valve 60 or to some fixed part thereby. The connecting-rod 81 connects to the middle joint 82 of the said toggle-links, and at its opposite end connects at 80 to the arm 79, that is fixed on one end of a shaft 76, whose other end carries the arm 75, from which arm the said regulator N is suspended by the rod 14. A stop, as 77, on the rod 14, and a stop, as 78, on the framework serve to limit the downward movement of said regulator. The relative positions of the valve 60 and the toggles at the closing of said valve are shown in Fig. 15. The operation of the mechanism for the purpose of regulation is as follows: The beam on its upward movement lifts the rod 14 from its position in Fig. 15 to that in Fig. 14. This operates the toggle-links 83 and 84 to throw the actuator 58 into its inoperative position, as there shown; but on the first downward movement of the beam the rod 14 is normally carried down by the descent of the regulator N to again set the toggle, as in Fig. 16, and thus throw the actuator 58 into its operative position, as there shown. Thus the actuator-shifting devices are operated at each stroke of the beam when the regulator is of the class N shown in my said prior Letters Patent.

The mode of operation thus far set forth is that taking place when the hopper P is substantially free of grain. When the grain accumulates in said hopper, as indicated in Fig. 2 of said prior Letters Patent, then said accumulation will prevent the descent of said regulator N, and thus maintain the actuator-shifting devices in their retracted position, as in Fig. 14, while the reducing-valve is closed. This allows both valves to be closed before the beam descends to the poising-point, and thus stops the machine. On the discharge of said accumulation of grain the weight of said part N and of the rod 14 operates through said shifting devices to operate the actuator for opening the valve 70, as in Fig. 15, and thus start the machine, after which the several operations are repeated, as before. The same rule respecting reference-characters as was observed in connection with the preceding Figs. 6 to 13, inclusive, has also been followed in this description of Figs. 14 and 15.

In this regulator grain-weigher the nature of the combinations is such that whether the form of the regulator apparatus or of the valve mechanism be the one or the other the valve-actuator is operated to close one or both of the valves on the working stroke of the regulator; but while the working stroke is usually a yielding and also a descending movement of the regulator it is not always so. In Figs. 14 and 15 the rod 14 is the same rod so designated in Letters Patent No. 410,117, granted to me August 27, 1888, and which connects with a regulator N, whose working stroke is upward, and in another application, Serial No. 340,297, filed March 1, 1890, I have shown a laterally-movable regulator 242, adapted to be used for operating the shiftable valve-actuator in its several forms herein shown.

When reference is herein made to the movement of the "scale-beam" the movement of the bucket-supporting arms thereof is meant, this coinciding, of course, with that of the bucket itself.

Having thus described my invention, I claim—

1. In a grain-weigher, the combination, with the supply-chute, the main beam, and a valve arranged to close under said chute, of valve-actuating devices carried on the main beam for actuating the valve to open the same, and regular apparatus connected therewith for making inoperative said devices by shifting the same on said beam.

2. In a grain-weigher, the combination, with the supply-chute and the scale-beam, of a valve or valves normally actuated to be opened by the beam, a regulator operated by the discharged grain, and a shiftable valve-actuator connected to effect the closing of said valve or valves on the yielding of said regulator independently of the beam.

3. In a grain-weigher, the combination, with the supply-chute and the scale-beam, of a valve or valves normally actuated to be opened by the beam, a regulator operated by the discharged grain, and a shiftable valve-actuator connected to close said valve or valves on the working-stroke of said regulator.

4. In a grain-weigher, the combination, with the supply-chute and the scale-beam, of a valve or valves normally actuated to be opened by the scale-beam on its upward stroke, a regulator operated by the discharged grain, and a shiftable valve-actuator connected to close said valve or valves on the yielding of said regulator.

5. In a grain-weigher, the combination, with the supply-chute and the scale-beam, of a valve or valves operating to close said chute, a regulator operated by the discharged grain, and a valve-actuator operated by the beam and by the regulator and intermediate to the valve or valves and the said beam and regulator.

6. In a grain-weigher, the combination, with the supply-chute and the scale-beam, of a valve or valves operating to partially or wholly close said chute, and a valve-actuator, substantially as described, operating said valve or valves, first from the scale-beam and secondly from the regulator, whereby the same valve serves first as a cut-off valve and secondly as a regulator-valve.

7. In a grain-weigher, the combination, with the supply-chute and the scale-beam, of a valve or valves normally actuated to be opened by the scale-beam on its upward stroke, a regulator operated by the discharged grain, and a shiftable valve-actuator carried by the scale-beam and connected to close said valve on the yielding of said regulator.

8. In a grain-weigher, the combination, with the supply-chute and the scale-beams, of the reducing and cut-off valves, each operating to partially close said chute, said reducing-valve being actuated directly from the scale-beam, a regulator operated by the discharged grain, and a valve-actuator operated by the beam and by the regulator and intermediate to the said beam and regulator and to the cut-off valve only.

9. In a grain-weigher, the combination, with the supply-chute and the scale-beam, of the reducing and cut-off valves, each operating to partially close said chute, said reducing-valve being actuated directly from the scale-beam, and a valve-actuator, substantially as described, operating only said cut-off valve, first from the scale-beam and secondly from the regulator, whereby the cut-off valve is actuated for the purposes of regulation independently of the movement of the scale-beam.

10. In a grain-weigher, the combination, with the supply-chute and the scale-beam, of a valve or valves normally actuated by the scale-beam, a regulator operated by the discharged grain, and a shiftable valve-actuator carried by the scale-beam and shiftable in the direction of the beam movement and connected to close said valve or valves on the yielding of said regulator.

11. In a grain-weigher, the combination, with the scale-beam and the reducing and the cut-off valves, of two connected actuators carried on the scale-beam, one for each said valve, respectively, a regulator, substantially as described, and intermediate actuator-shifting devices operating to shift both actuators on the movement of said regulator.

12. In a grain-weigher, the combination, with the scale-beam, of the cut-off valve and its arm, the actuator-arm carried on the beam and adapted to actuate said valve through said valve-arm, the regulator, and intermediate actuator-shifting devices operating to shift said actuator-arm on the working-stroke of said regulator.

13. In a grain-weigher, the combination, with the scale-beam, of the cut-off valve and its arm, the actuator-arm carried on the beam and adapted to actuate said valve through said valve-arm, the regulator, the cam intermediate to the beam and said actuator-arm, and cam-shifting devices intermediate to said actuator-shifting cam and the regulator, whereby said actuator may be operated independently of the beam movement.

14. In a grain-weigher, the combination, with the scale-beam, of the cut-off valve and its arm, the actuator-arm carried on the beam, the cam intermediate to said beam and actuator, a toggle intermediate to said cam and the beam, and the regulator connected to actuate said toggle, whereby the cut-off valve may be operated independently of the beam movement.

FRANCIS H. RICHARDS.

Witnesses:
HENRY L. RECKARD,
W. M. BYORKMAN.